(12) United States Patent
Balmakhtar et al.

(10) Patent No.: US 12,213,011 B2
(45) Date of Patent: Jan. 28, 2025

(54) WIRELESS DATA SERVICE DELIVERY TO A WIRELESS UE BASED ON A SECURITY POLICY FOR THE WIRELESS UE

(71) Applicant: T-MOBILE INNOVATIONS LLC, Overland Park, KS (US)

(72) Inventors: Marouane Balmakhtar, Fairfax, VA (US); Gregory David Schumacher, Holliston, MA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 490 days.

(21) Appl. No.: 17/706,896

(22) Filed: Mar. 29, 2022

(65) Prior Publication Data

US 2023/0319653 A1  Oct. 5, 2023

(51) Int. Cl.
*H04W 36/00* (2009.01)
*H04W 12/04* (2021.01)

(52) U.S. Cl.
CPC ....... *H04W 36/0038* (2013.01); *H04W 12/04* (2013.01)

(58) Field of Classification Search
CPC . H04W 36/0038; H04W 36/00; H04W 12/04; H04W 36/0033
See application file for complete search history.

(56) References Cited

U.S. PATENT DOCUMENTS

| | | |
|---|---|---|
| 9,986,483 B1 | 5/2018 | Balmakhtar et al. |
| 10,033,660 B2 | 7/2018 | Balmakhtar et al. |
| 10,164,914 B2 | 12/2018 | Rajagopal et al. |
| 10,237,274 B2 | 3/2019 | Balmakhtar et al. |
| 10,284,434 B1 | 5/2019 | Rajagopal et al. |
| 10,326,669 B2 | 6/2019 | Rajagopal et al. |
| 10,341,871 B2 | 7/2019 | Velusamy et al. |
| 10,349,279 B2 | 7/2019 | Myers et al. |
| 10,404,456 B2 | 9/2019 | Paczkowski et al. |
| 10,433,275 B2 | 10/2019 | Edge et al. |
| 10,623,415 B2 | 4/2020 | Paczkowski et al. |
| 10,681,552 B2 | 6/2020 | Fitzgerald et al. |
| 10,686,791 B1 | 6/2020 | Balmakhtar et al. |
| 10,719,601 B2 | 7/2020 | Paczkowski et al. |
| 10,813,136 B2 | 10/2020 | Yerramalli et al. |
| 10,932,108 B1 | 2/2021 | Balmakhtar et al. |
| 11,057,203 B2 | 7/2021 | Paczkowski et al. |
| 11,122,405 B2 | 9/2021 | Zhang et al. |

(Continued)

*Primary Examiner* — Lester G Kincaid
*Assistant Examiner* — Dung L Lam

(57) ABSTRACT

In a wireless communication system, a source access node receives a security policy for a User Equipment (UE) from a wireless network core. The wireless network core and the UE establish security context over the source access node. The wireless network core and the UE exchange user data over the source access node based on the security context. The source access node handsover the wireless UE to a target access node and transfers the security policy for the wireless UE to the target access node. The target access node signals the wireless network core to establish new security context for the wireless UE responsive to the security policy. The wireless network core and the wireless UE establish new security context over the target access node. The wireless network core and the UE exchange additional user data over the target access node based on the new security context.

20 Claims, 9 Drawing Sheets

(56) References Cited

U.S. PATENT DOCUMENTS

| | | |
|---|---|---|
| 2017/0208090 A1 | 7/2017 | Balmakhtar et al. |
| 2019/0158540 A1 | 5/2019 | Mahaffey et al. |
| 2019/0159025 A1* | 5/2019 | Ben Henda ......... H04W 36/385 |
| 2019/0215741 A1 | 7/2019 | Balmakhtar et al. |
| 2019/0245747 A1 | 8/2019 | Balmakhtar et al. |
| 2019/0273663 A1 | 9/2019 | Balmakhtar et al. |
| 2019/0320322 A1 | 10/2019 | Jayawardene et al. |
| 2024/0056907 A1* | 2/2024 | Wu ................... H04W 36/0064 |

* cited by examiner

WIRELESS DATA SERVICE DELIVERY TO A WIRELESS UE BASED ON A SECURITY POLICY FOR THE WIRELESS UE

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), User Plane Functions (UPFs), and the like.

The wireless communication network develop user context for the wireless user devices. Some of the user context indicates network addresses and service quality. Other user context comprises security context that indicates cryptography keys, authentication status, authorization status, and the like. The wireless communication networks transfer some of the context to the wireless access nodes to drive the delivery of the wireless data services to the wireless user devices. For example, a wireless user device and an AMF may use cryptography keys to secure an N1 signaling link.

As the wireless user devices move about, the wireless access nodes hand-over individual wireless user devices among one another through the exchange of handover signaling. The handover signaling often carries some of the context. For example, a user address and a service quality may be indicated in the context that follows the wireless user device around the wireless communication network in the handover signaling. Unfortunately, the wireless communication networks do not effectively manage security context in response to user device handovers. Moreover, the wireless access nodes do not efficiently refresh the security context in response to the user handovers.

TECHNICAL OVERVIEW

In a wireless communication system, a source access node receives a security policy for a User Equipment (UE) from a wireless network core. The wireless network core and the UE establish security context over the source access node. The wireless network core and the UE exchange user data over the source access node based on the security context. The source access node handsover the wireless UE to a target access node and transfers the security policy for the wireless UE to the target access node. The target access node signals the wireless network core to establish new security context for the wireless UE responsive to the security policy. The wireless network core and the wireless UE establish new security context over the target access node. The wireless network core and the UE exchange additional user data over the target access node based on the new security context.

DETAILED DESCRIPTION

Figure 1:
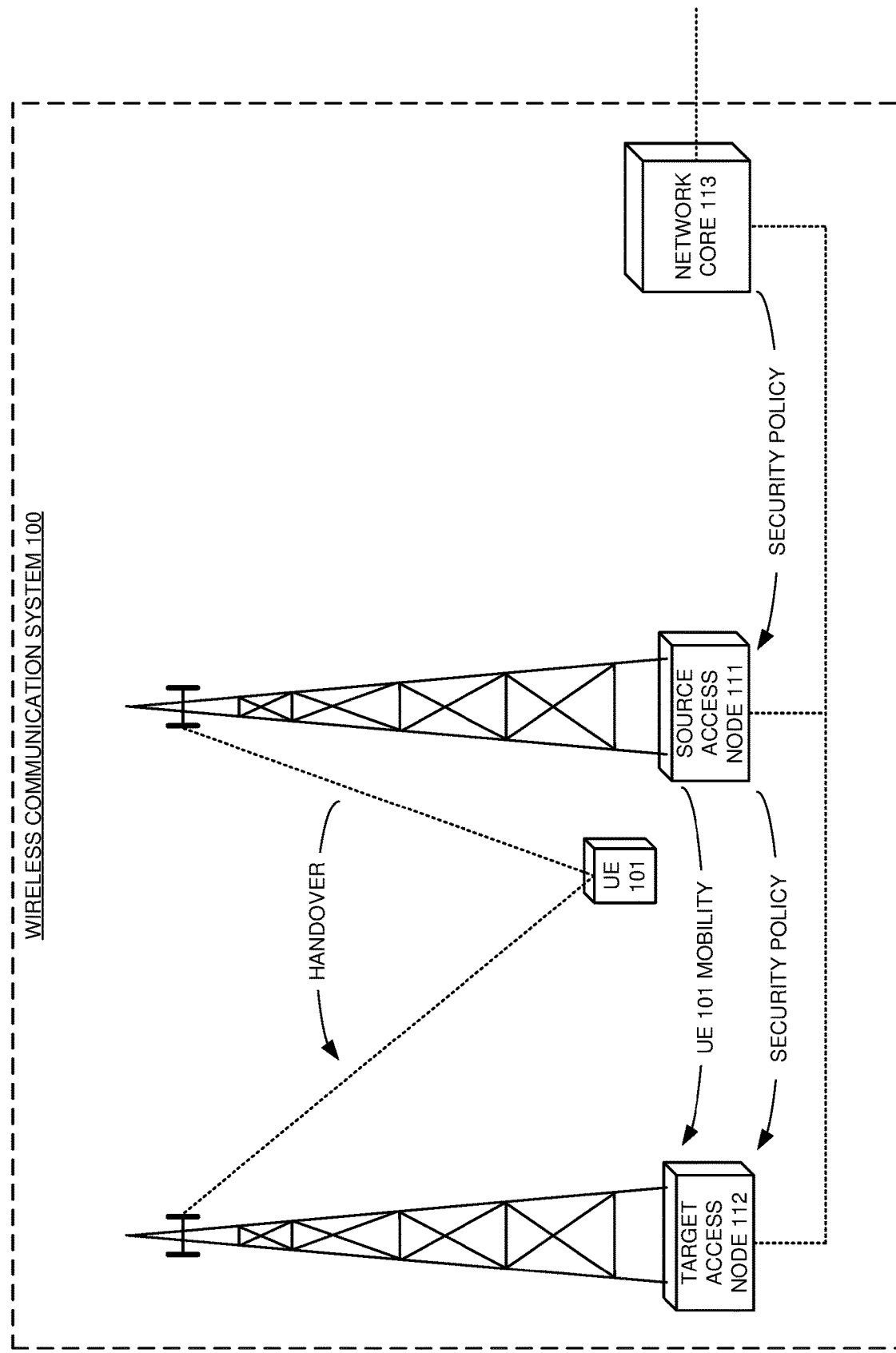
FIG. 1 illustrates an exemplary wireless communication system to serve a wireless data service to a wireless User Equipment (UE) per a security policy.

FIG. 1 illustrates exemplary wireless communication system 100 to serve a wireless data service to wireless User Equipment (UE) 101 per a security policy. Wireless communication system 100 comprises wireless UE 101, source access node 111, target access node 112, and network core 113. Exemplary wireless data services include machine-control, internet-access, media-streaming, and social-networking. Wireless UE 101 comprises a phone, computer, vehicle, robot, sensor, or some other user apparatus with wireless communication circuitry. Access nodes 111-112 comprise base stations, hotspots, or some other network element with wireless communication circuitry and network connectivity. Wireless network core 113 comprises an Access and Mobility Management Function (AMF), Unified Data Management (UDM), Policy Control Function (PCF), (Session Management Function) and/or some other network elements. Wireless communication system 100 is simplified for clarity and would typically include many more UEs and access nodes that are configured and operate in a similar manner.

Various examples of network operation and configuration are described herein. In some examples, source access node 111 receives a security policy for wireless UE 101 from wireless network core 113. Source access node 111 exchanges signaling and data with wireless UE 101 and with wireless network core 113. Wireless network core 113 and wireless UE 101 establish security context over source access node 111. The security context comprises cryptography keys, UE authentication data, service authorization data, and/or some other user information. The security policy indicates when UE 101 should reestablish at least some of the security context based on UE 101 actions like mobility. Wireless network core 113 and UE 101 exchange user data over source access node 111 based on the security context.

For example, wireless network core and UE 101 may use cryptography keys to encrypt and decrypt their N1 signaling. In response to source access node 111 handing UE 101 over to target access node 112, source access node 111 transfers the security policy (and context) for wireless UE 101 to target access node 112. Target access node 112 receives the security policy from source access node 111, and in response to the security policy, target access node 112 signals wireless network core to establish new security context for wireless UE 101. For example, the security policy may indicate a requirement for new cryptography keys for UE 101 after any handover from source access node 111. Target access node 112 exchanges signaling and data with wireless UE 101 and with wireless network core 113. Wireless network core 113 and wireless UE 101 establish the new security context over target access node 112. Wireless network core 113 and wireless UE 101 exchange user data over the target access node 112 based on the new security context.

The security policy for UE 101 may require a portion of the security context to be reestablished after UE 101 performs: 1) a handover from source access node 111, 2) a handover to target access node 112, 3) entry into a particular geographic area, 4) egress from a particular geographic area, 5) return from idle mode in a particular geographic area, 6) attachment to a particular wireless network, 7) detachment from a particular wireless network, 8) time-expiry detection for the UE authentication or service authorization, and/or 9) some other action that is indicated in the security policy. In some examples, the existing security context may be used to establish new security context—like when UE 101 uses existing security context to reauthenticate with wireless network core 130. Advantageously, wireless communication system effectively manages the security context in response to UE 101 handovers. Moreover, access nodes 111-112 efficiently refresh the security context in response to UE 101 handovers.

UE 101 and access nodes 111-112 wirelessly communicate over radio channels using wireless protocols like Fifth Generation New Radio (5GNR), Long Term Evolution (LTE), Institute of Electrical and Electronic Engineers (IEEE) 802.11 (WIFI), Bluetooth Low Energy (BLE), Internet-of-Things (IoT), Radio Frequency Identification (RFID), Near Field Communications (NFC), Low-Power Wide Area Network (LP-WAN), or the like. Access nodes 111-112 and network core 113 communicate over network connections that comprise metallic wiring, glass fibers, radio channels, or some other communication media. The network connections may use 5GNR, LTE, WIFI, LP-WAN, IEEE 802.3 (ETHERNET), Internet Protocol (IP), Time Division Multiplex (TDM), Data Over Cable System Interface Specification (DOCSIS), Synchronous Optical Network (SONET), virtual switching, inter-processor communication, bus interfaces, and/or some other data communication protocols. UE 101, access nodes 111-112, and core 113 comprise microprocessors, software, memories, transceivers, radios, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication system 100 as described herein.

Figure 2:
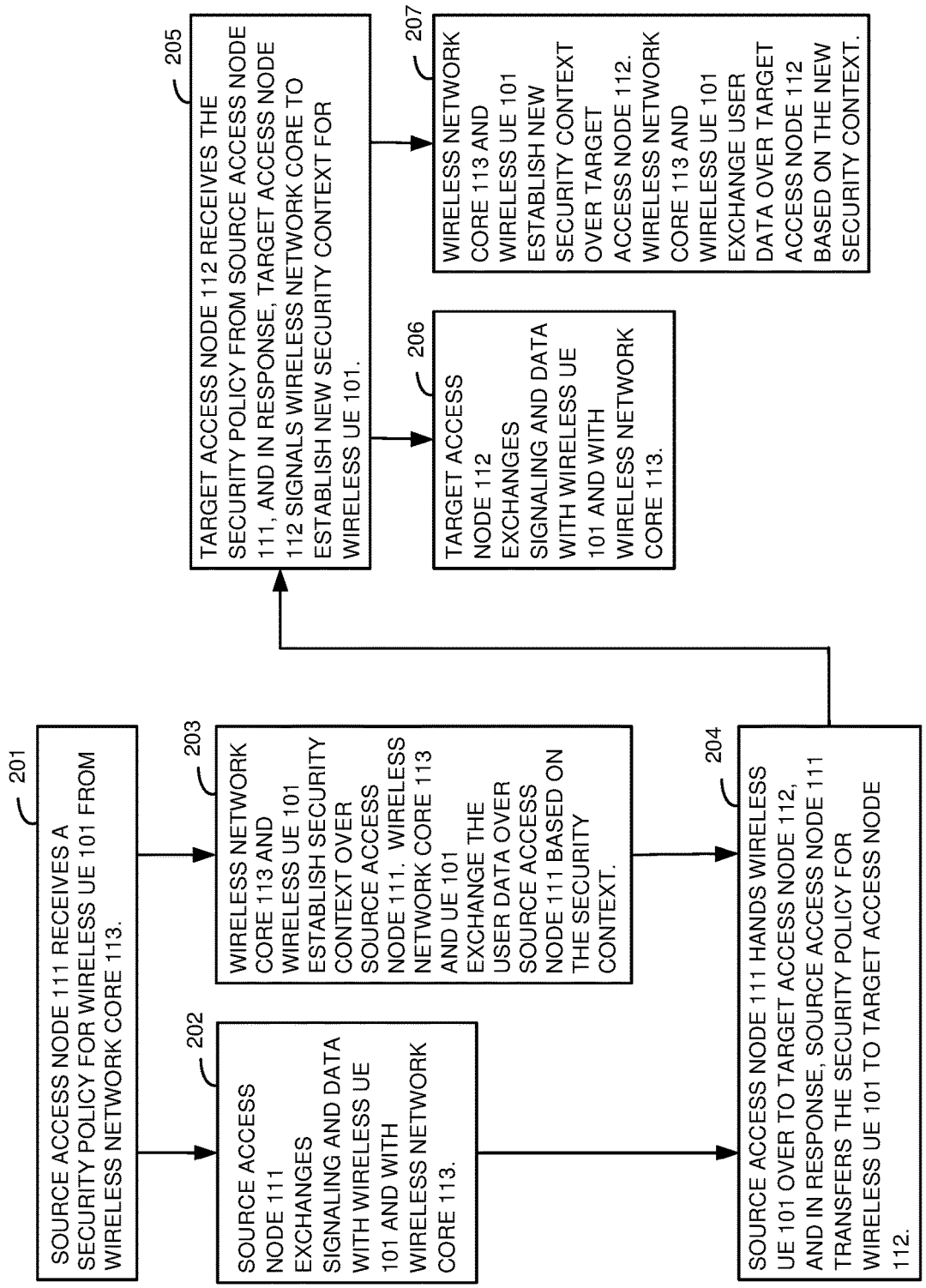
FIG. 2 illustrates an exemplary operation of the wireless communication system to serve the wireless data service to the wireless UE per the security policy.

FIG. 2 illustrates an exemplary operation of wireless communication system 100 to serve the wireless data service to wireless UE 101 per the security policy. The operation may vary in other examples. Source access node 111 receives a security policy for wireless UE 101 from wireless network core 113 (201). Source access node 111 exchanges signaling and data with wireless UE 101 and with wireless network core 113 (202). Wireless network core 113 and wireless UE 101 establish security context over source access node 111 and then exchange user data over source access node 111 based on the security context (203). Source access node 111 hands wireless UE 101 over to target access node 112, and in response, source access node 111 transfers the security policy for wireless UE 101 to target access node 112 (204). Target access node 112 receives the security policy from source access node 111, and in response, target access node 112 signals wireless network core 113 to establish new security context for wireless UE 101 (205). Target access node 112 exchanges signaling and data with wireless UE 101 and with wireless network core 113 (206). Wireless network core 113 and wireless UE 101 establish the new security context over target access node 112 and then exchange user data over target access node 112 based on the new security context (207).

Figure 3:
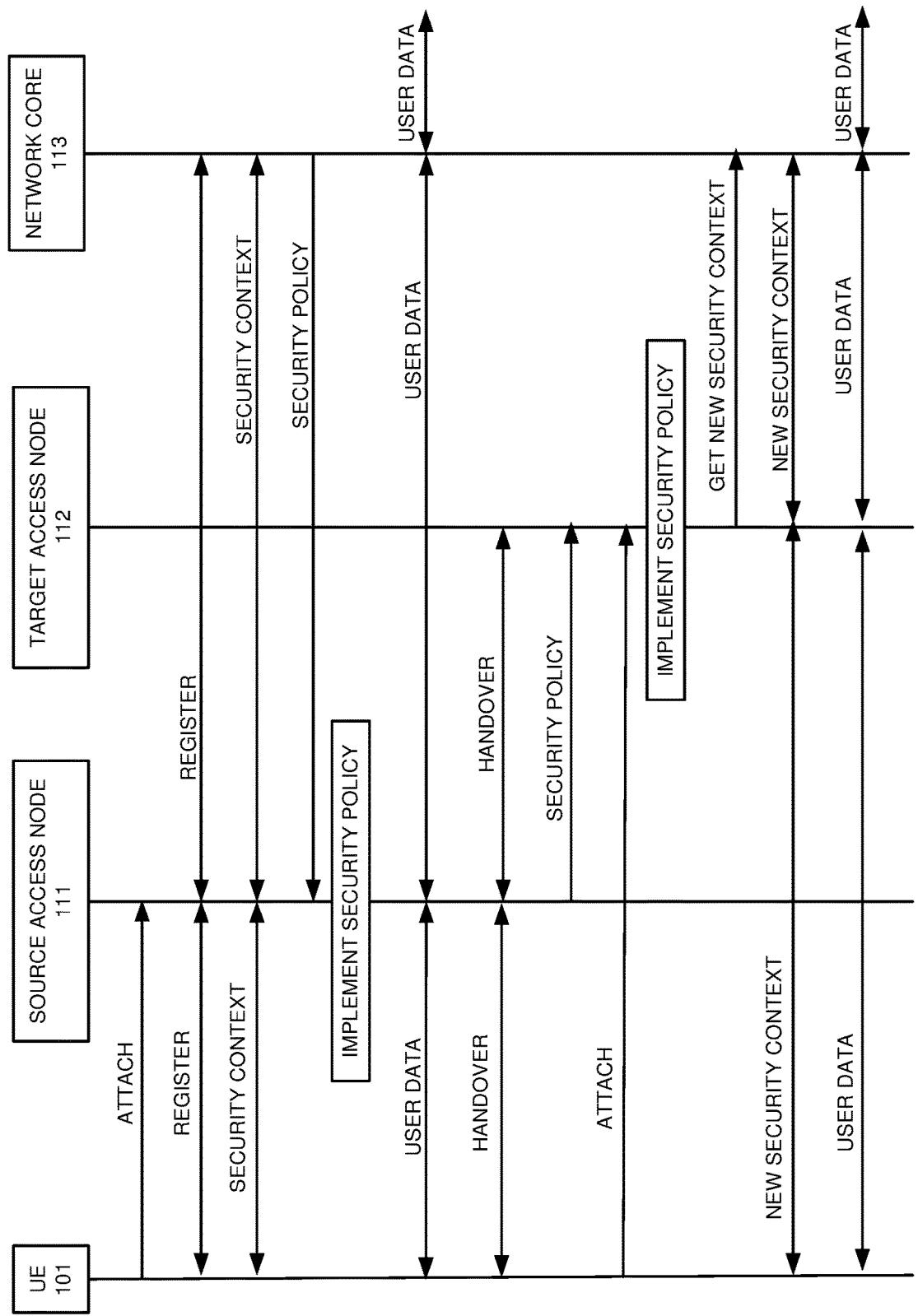
FIG. 3 illustrates an exemplary operation of the wireless communication system to serve the wireless data service to the wireless UE per the security policy.

FIG. 3 illustrates an exemplary operation of wireless communication system 100 to serve the wireless data service to wireless UE 101 per the security policy. The operation may vary in other examples. Wireless UE 101 wirelessly attaches to source access node 111. Wireless UE 101 registers with wireless network core 113 over source access node 111. Wireless UE 101 and wireless network core 113 determine security context for UE 101 over source access node 111. Source access node 111 receives a security policy for wireless UE 101 from wireless network core 113. Source access node 111 implements the security policy—which may require no action at this point. Wireless network core 113 and UE 101 exchange user data over source access node 111 based on the security context.

UE 101 and source access node exchange handover signaling for UE 101 and target access node 112. Source access node 111 and target access node 112 exchange handover signaling for UE 101. Source access node 111 transfers the security policy for wireless UE 101 to target access node 112 in response to the handover.

Wireless UE 101 wirelessly attaches to target access node 112. In response to the security policy for UE 101 and the handover, target access node 112 signals wireless network core to establish new security context for wireless UE 101. Wireless network core 113 and wireless UE 101 establish the new security context over target access node 112. Wireless network core 113 and wireless UE 101 exchange additional user data over the target access node 112 based on the new security context.

Figure 4:
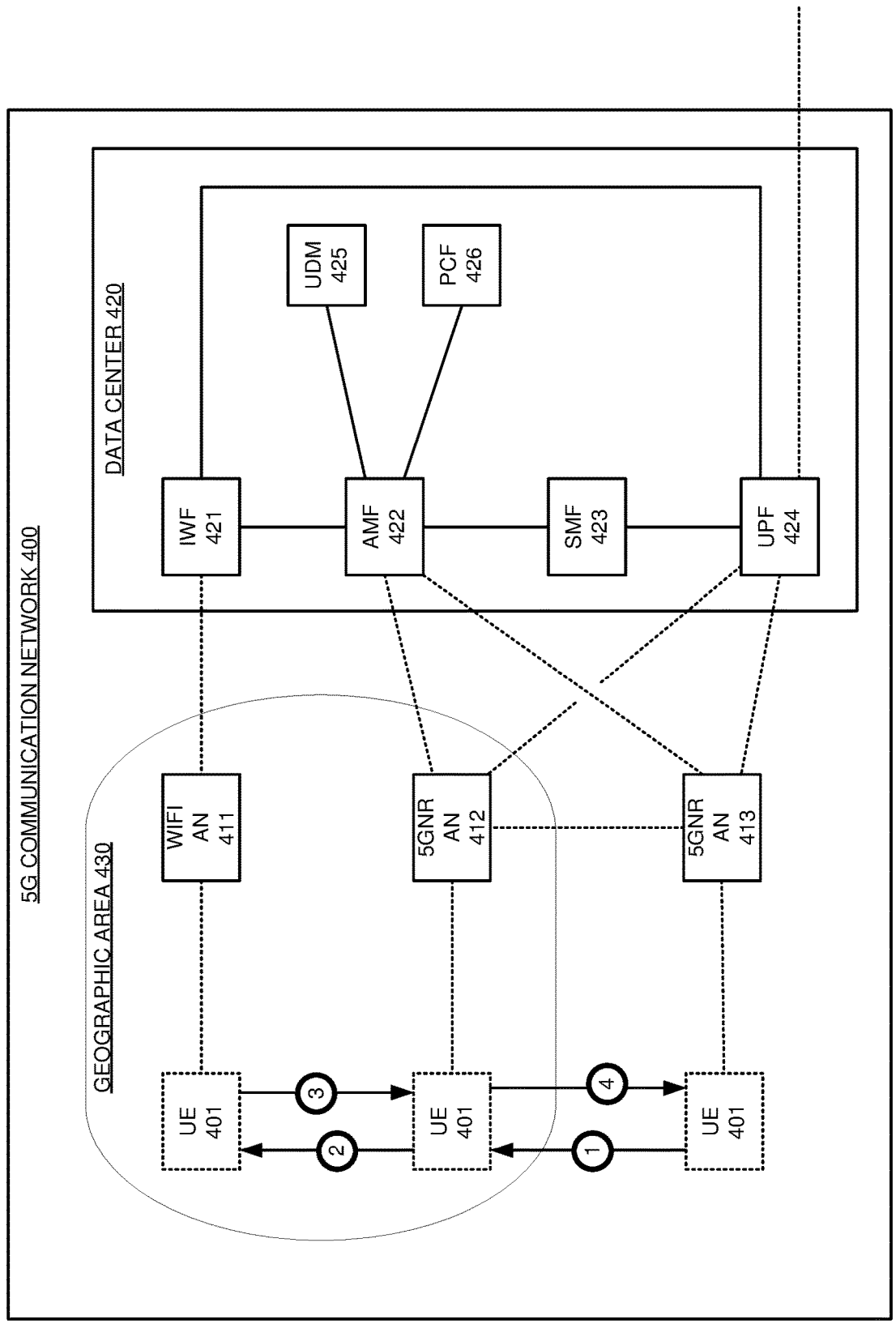
FIG. 4 illustrates an exemplary Fifth Generation (5G) communication network to serve a wireless data service to a wireless UE per a security policy.

FIG. 4 illustrates exemplary Fifth Generation (5G) communication network 400 to serve a wireless data service to wireless UE 401 per a security policy. 5G communication network 400 comprises an example of wireless communication system 100, although system 100 may differ. 5G communication network 400 comprises: UE 401, WIFI Access Node (AN) 411, 5GNR ANs 412-413, and network data center 420. Network data center 420 comprises Interworking Function (IWF) 421, Access and Mobility Management Function (AMF) 422, Session Management Function (SMF) 423, User Plane Function (UPF) 424, Unified Data Management (UDM) 425, and Policy Control Function (PCF) 426.

Initially, UE 401 is positioned at the bottom left of FIG. 4. UE 401 wirelessly attaches to 5GNR AN 413 and registers with AMF 422. AMF 422 authenticates UE 401 over 5GNR AN 413 and adds time-stamped authentication data to the security context for UE 401. AMF 422 authorizes UE 401 for a data service and adds time-stamped authorization data to the security context for UE 101. AMF 422 interacts with UDM 425— possibly through an Authentication and Security Function (AUSF) to perform the authentication and authorization based on UE 401 data that us stored in UDM 425 or in its Unified Data Repository (UDR). The UE 401 data includes the security context for UE 401. AMF 422 interacts with PCF 426 to obtain a security policy for UE 401. AMF 422 may interact with SMF 423 to develop some security context and policy for UE 401 like session keys. AMF 422 transfers the security policy, some security context, and some other context for UE 401 to 5GNR AN 413. 5GNR AN 413 transfers some of the security context and the other context to UE 401. AMF 422 transfers some of the context to SMF 423 to serve UE 401. SMF 423 transfers some of the context to UPF 424 to serve UE 401. UE 401 exchanges user data with an external system (not shown) over 5GNR AN 413 and UPF 424.

As indicated by arrow #1, UE 401 moves away from 5GNR AN 413 and toward 5GNR AN 412. UE 401 receives a signals from 5GNR 412 and transfers signal strength data for 5GNR AN 412 to 5GNR AN 413. 5GNR AN 413 initiates a handover based on the comparison and signals UE 401, 5GNR AN 412, and AMF 422. 5GNR AN 413 transfers the security policy, security context, and other context for UE 401 to 5GNR AN 412. AMF 422 indicates new AN 412 for UE 401 to SMF 423 which indicates new AN 412 for UE 401 to UPF 424. UE 401 now exchanges user data with an external system (not shown) over 5GNR AN 412 and UPF 424. Contemporaneously and responsive to the handover, 5GNR AN 412 processes the security policy for UE 401. In this example, the security policy for UE 401 requires new N1 cryptography keys when UE 401 enters geographic area 430 which includes 5GNR AN 412. UE 401 enters geographic area 430 to attach to 5GNR AN 412. In response to the handover and the security policy, 5GNR AN 412 signals AMF 422 that new N1 cryptography keys for UE 401 are required. AMF 422 interacts with UE 401 establish new N1 cryptography keys and AMF 422 updates the security context for UE 401 with the new cryptography keys.

As indicated by arrow #2, UE 401 moves away from 5GNR AN 412 and toward WIFI AN 411. UE 401 wirelessly attaches to WIFI AN 411, and in this example, UE 401 detaches from 5GNR AN 412. UE 401 interacts with IWF 421 to establish a secure link and then registers with AMF 422. AMF 422 authenticates UE 401 over WIFI AN 411 and IWF 421 and adds time-stamped authentication data to security context for UE 401. AMF 422 may obtain some existing security context from UE 401 and verify this security context to reauthenticate UE 401. AMF 422 authorizes UE 401 for a data service and adds time-stamped authorization data to the security context for UE 101. AMF 422 interacts with UDM 425 to perform the authentication and authorization. AMF 422 interacts with PCF 426 to obtain a security policy for UE 401. AMF 422 may interact with SMF 423 to develop some security context and policy for UE 401. AMF 422 transfers the security policy and some of the security context and other context for UE 401 to IWF 422. IWF 422 transfers some of the security context and the other context to UE 401 over WIFI AN 411. AMF 422 transfers some of the context to SMF 423 to serve UE 401. SMF 423 transfers some of the context to UPF 424 to serve UE 401. UE 401 exchanges user data with an external system (not shown) over WIFI AN 411, IWF 421, and UPF 424. Contemporaneously and responsive to the handover, IWF 421 processes the security policy for UE 401. In this example, the security policy for UE 401 requires a new public key for network 400 when UE 401 uses WIFI AN 411. In response to the handover and the security policy, IWF 422 signals AMF 422 that another public key for UE 401 is required. AMF 422 interacts with UDM 425 and UE 401 to transfer the new public key to UE 401.

As indicated by arrow #3, UE 401 moves back toward 5GNR AN 412. UE 401 wirelessly attaches to 5GNR AN 412 and registers with AMF 422. AMF 422 authenticates UE 401 over 5GNR AN 412 and adds time-stamped authentication data to security context for UE 401. AMF 422 may verify existing security context from UE 401 for authentication. AMF 422 authorizes UE 401 for a data service and adds time-stamped authorization data to the security context for UE 101. AMF 422 interacts with UDM 425 to perform the authentication and authorization based on UE 401 data that us stored in UDM 425 or in its UDR. The UE 401 data includes the security context for UE 401. AMF 422 interacts with PCF 426 to obtain a security policy for UE 401. AMF 422 may interact with SMF 423 to develop some security context and policy for UE 401. AMF 422 transfers the security policy, some security context, and some other context for UE 401 to 5GNR AN 413. 5GNR AN 413 transfers some of the security context and the other context to UE 401. AMF 422 transfers some of the context to SMF 423 to serve UE 401. SMF 423 transfers some of the context to UPF 424 to serve UE 401. UE 401 exchanges user data with an external system (not shown) over 5GNR AN 413 and UPF 424.

As indicated by arrow #4, UE 401 moves away from 5GNR AN 412 and toward 5GNR AN 413. UE 401 receives signals from 5GNR 412 and transfers signal strength data for 5GNR AN 413 to 5GNR AN 412. 5GNR AN 412 initiates a handover based on the comparison and signals UE 401, 5GNR AN 413, and AMF 422. 5GNR AN 412 transfers the security policy and some of the security context and other context for UE 401 to 5GNR AN 413. AMF 422 indicates new AN 413 for UE 401 to SMF 423 which indicates new AN 413 for UE 401 to UPF 424. UE 401 now exchanges user data with an external system (not shown) over 5GNR AN 413 and UPF 424. Contemporaneously and responsive to the handover, 5GNR AN 413 processes the security policy for UE 401. In this example, the security policy for UE 401 requires new service authorization based on the time lapse since the last service authorization as indicated by the security context that is has received. In response to the handover and the security policy, 5GNR AN 413 signals AMF 422 that a new service authorization for UE 401 is required. AMF 422 interacts with UE 401 and UDM 425 and possibly SMF 423 to reauthorize UE 401 for the data service—and in other examples, the service reauthorization could be denied. In other examples, the security policy for UE 401 may require various different portions of the security context to be reestablished after UE 101 performs: 1) a handover from a particular access node or network, 2) a handover to a particular access node or network, 3) entry into a particular geographic area, 4) egress from a particular geographic area, 5) return from idle mode in a particular geographic area, and/or 6) some other action.

Figure 5:
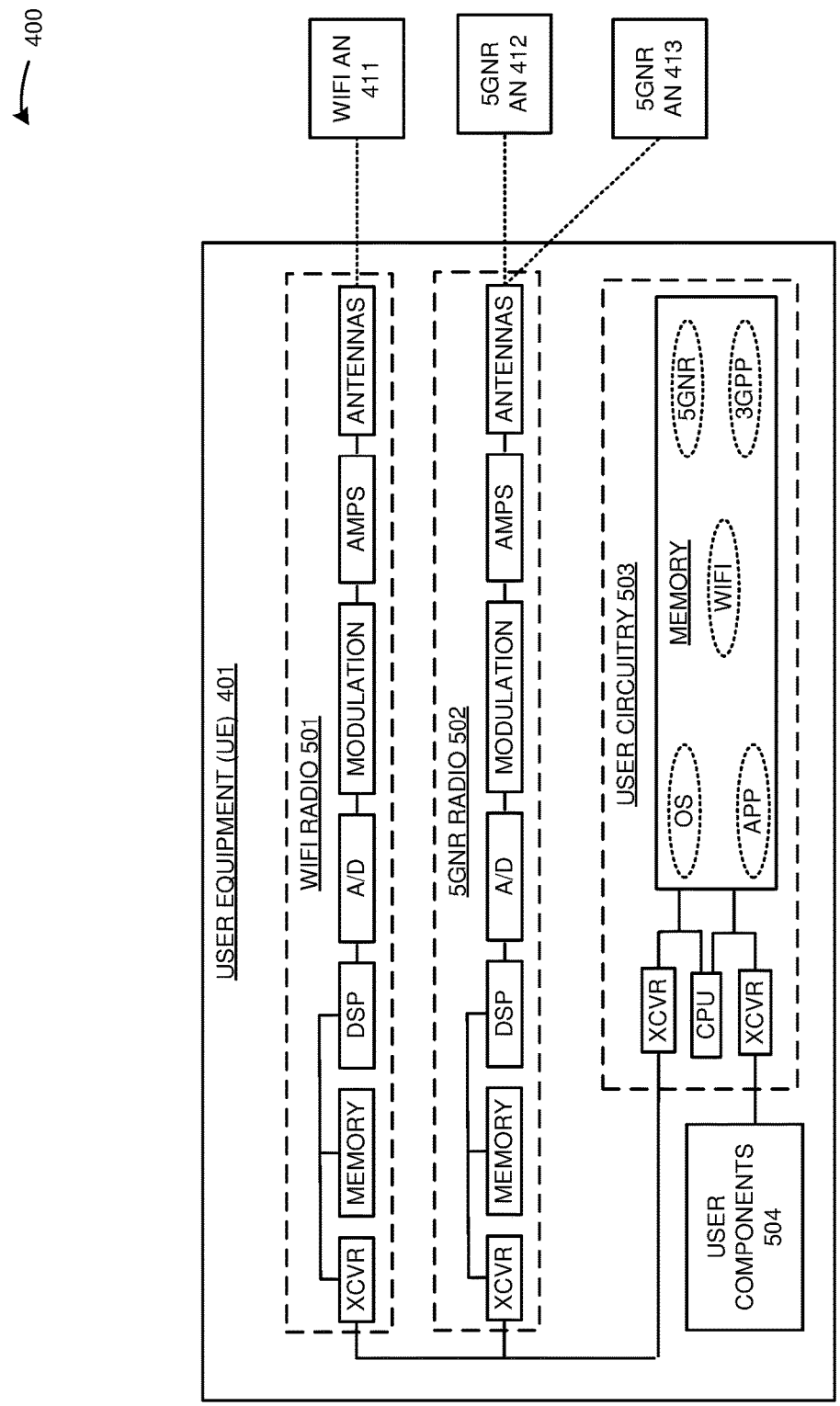
FIG. 5 illustrates an exemplary wireless UE in the 5G communication network.

FIG. 5 illustrates exemplary wireless UE 401 in 5G communication network 400. UE 401 comprises an example of UE 101 although UE 101 may differ. UE 401 comprises WIFI radio 501, 5GNR radio 502, user circuitry 503, and user components 504. User components 504 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. User circuitry 503 comprises memory, CPU, user interfaces and components, and transceivers that are coupled over bus circuitry. The memory in user circuitry 503 stores an operating system (OS), user applications (APP), and network applications for WIFI, ENET, 5GNR, and IP. The antennas in WIFI radio 501 are wirelessly coupled to WIFI AN 411 over a WIFI. The antennas in 5GNR radio 502 are wirelessly coupled to 5GNR ANs 412-413 over 5GNR links. Transceivers (XCVRs) in radios 501-502 are coupled to transceivers in user circuitry 504. Transceivers in user circuitry 503 are coupled to user components 504. The CPU in user circuitry 503 executes the operating system, user applications, and network applications to exchange network signaling and user data with ANs 411-413 over radios 501-502.

Figure 6:
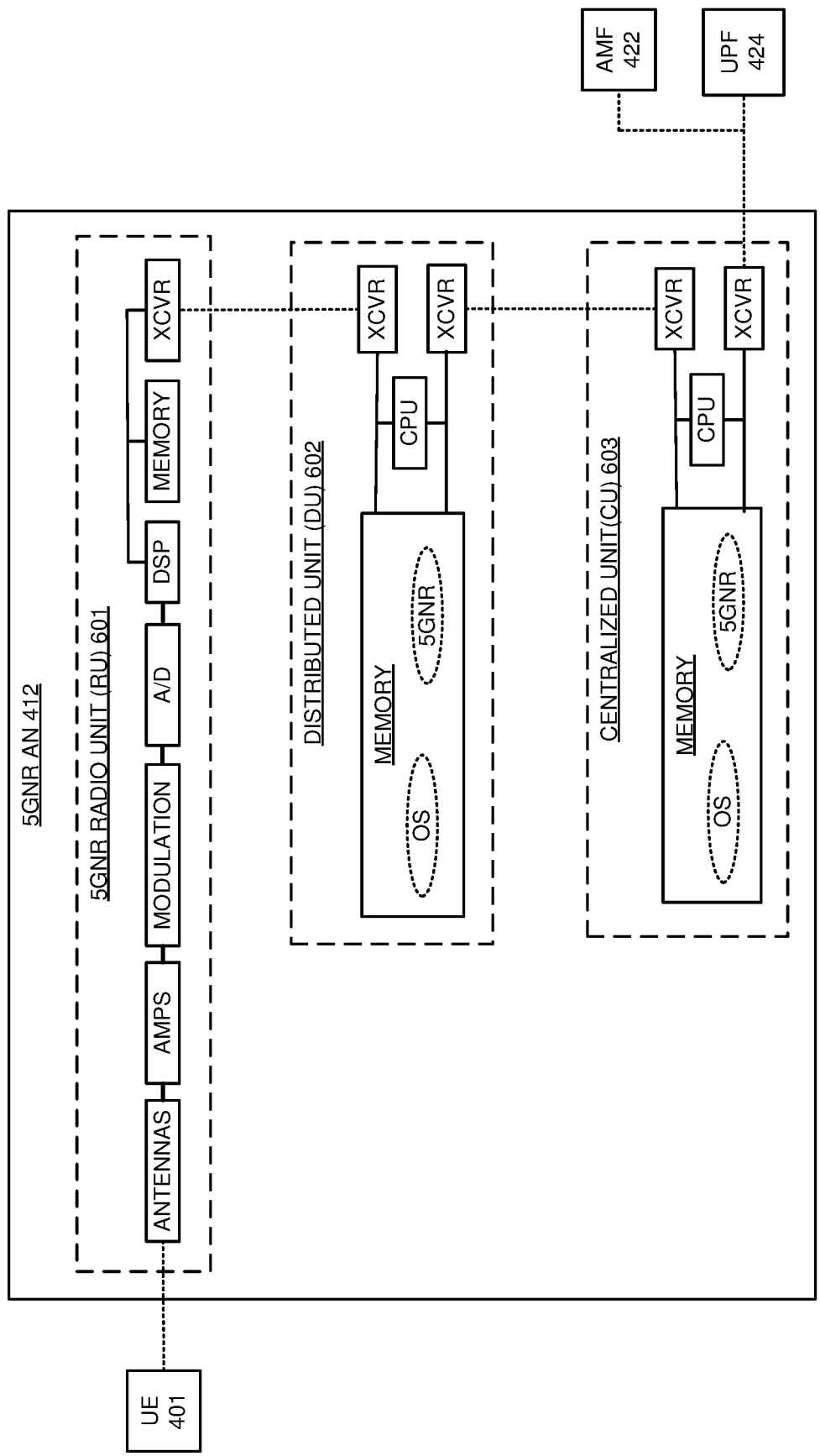
FIG. 6 illustrates an exemplary 5GNR Access Node (AN) in the 5G communication network.

FIG. 6 illustrates exemplary 5GNR Access Node (AN) 412 in 5G communication network 400. 5GNR AN 412 comprises an example of ANs 111-112 and 413, although ANs 111-112 and 413 may differ. 5GNR AN 405 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system, security application, and 5GNR network applications for packet data convergence protocol, service data adaption protocol, and radio resource control. The antennas in 5GNR RU 601 are wirelessly coupled to UE 401 over 5GNR links. Transceivers in 5GNR RU 601 are coupled to transceivers in DU 602. Transceivers in DU 602 are coupled to transceivers in CU 603. Transceivers in CU 603 are coupled AMF 422 and UPF 424. The DSP and CPU in RU 601, DU 602, and CU 603 execute the radio applications, operating systems, security application, and network applications to exchange data and signaling with UE 401, AMF 422, and UPF 424. In particular, the Radio Resource Control (RRC) in the 5GNR network applications in CU 603 handles the security polices and security context as described herein for access nodes.

Figure 7:
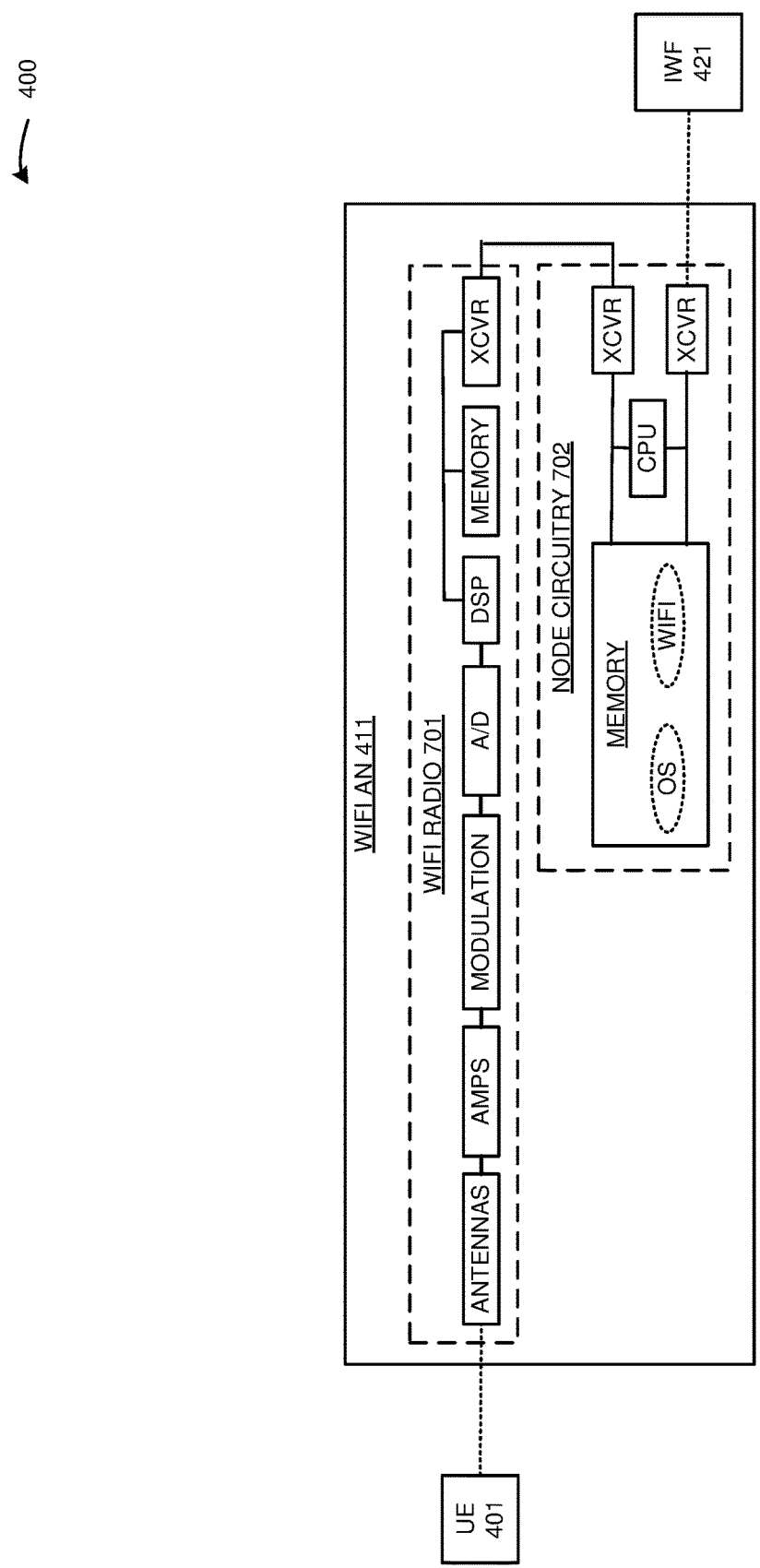
FIG. 7 illustrates an exemplary WIFI AN in the 5G communication network.

FIG. 7 illustrates exemplary WIFI AN 411 in 5G communication network 400. WIFI AN 411 comprises an example of ANs 111-112, although, ANs 111-112 may differ. WIFI AN 411 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to UE 401 over a WIFI link. Transceivers in WIFI radio 701 are coupled to transceivers in node circuitry 702. Transceivers in node circuitry 702 are coupled to transceivers in IWF 421. The CPU in node circuitry 702 executes the operating system and network applications to exchange data with UE 401 and IWF 421.

Figure 8:
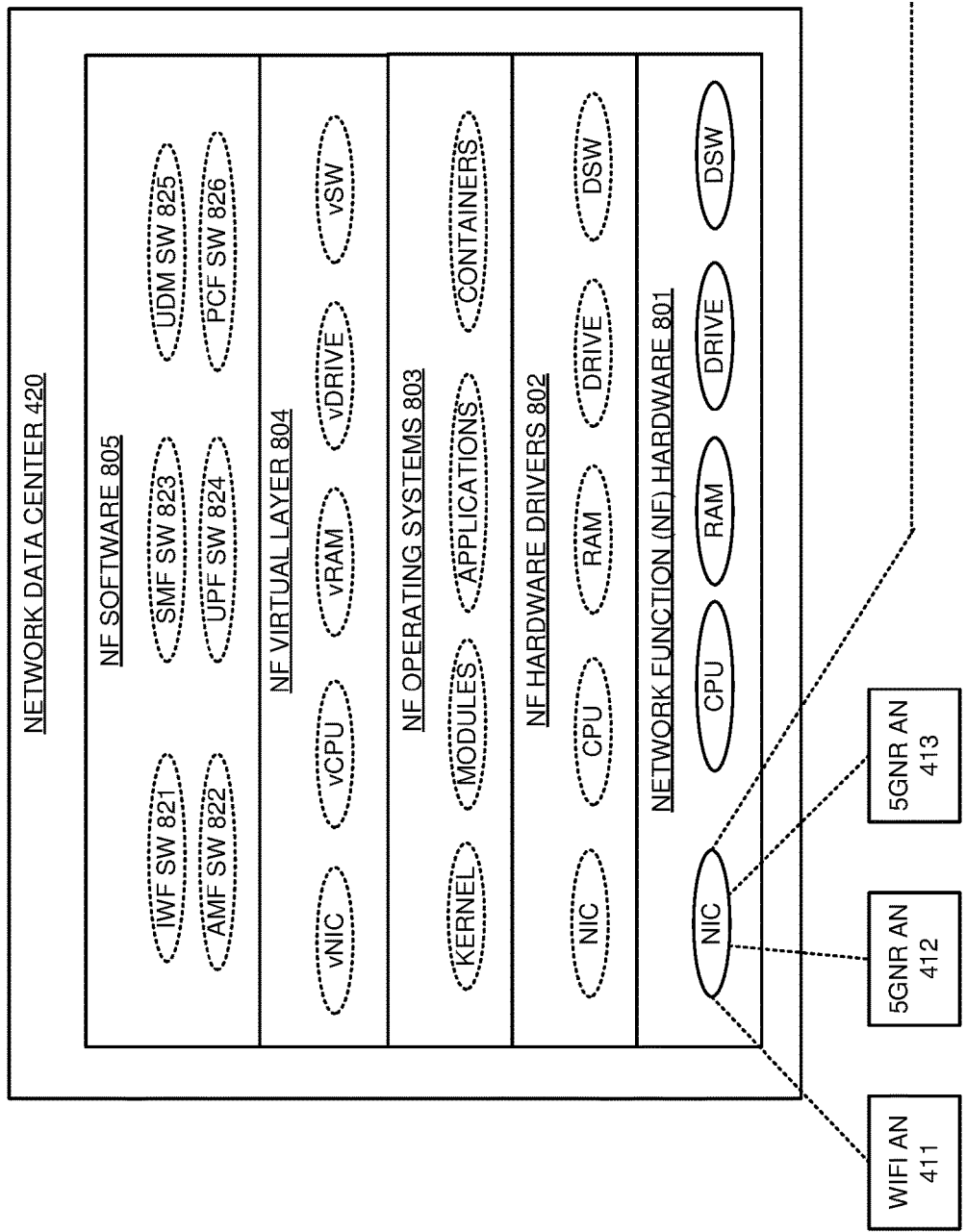
FIG. 8 illustrates an exemplary data center in the 5G communication network.

FIG. 8 illustrates exemplary data center 420 in 5G communication network 400. Network data center 420 comprises an example of network core 113, although core 113 may differ. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 704 comprises vNIC, vCPU, vRAM, vDRIVE, and vSW. NF SW 805 comprises IWF SW 821, AMF SW 822, SMF SW 823, UPF SW 824, UDM SW 825, and PCF SW 826. Other NF SW like Network Repository Function (NRF) SW are typically present but are omitted for clarity. Network data center 420 may be located at a single site or be distributed across multiple geographic locations. The NIC in NF hardware 801 are coupled to WIFI AN 411, 5GNR ANs 412-413, and external systems. NF hardware 801 executes drivers 802, operating systems 803, virtual layer 804 and NF SW 805 to form and operate IWF 421, AMF 422, SMF 423, UPF 424, UDM 425, and PCF 426 as described herein.

Figure 9:
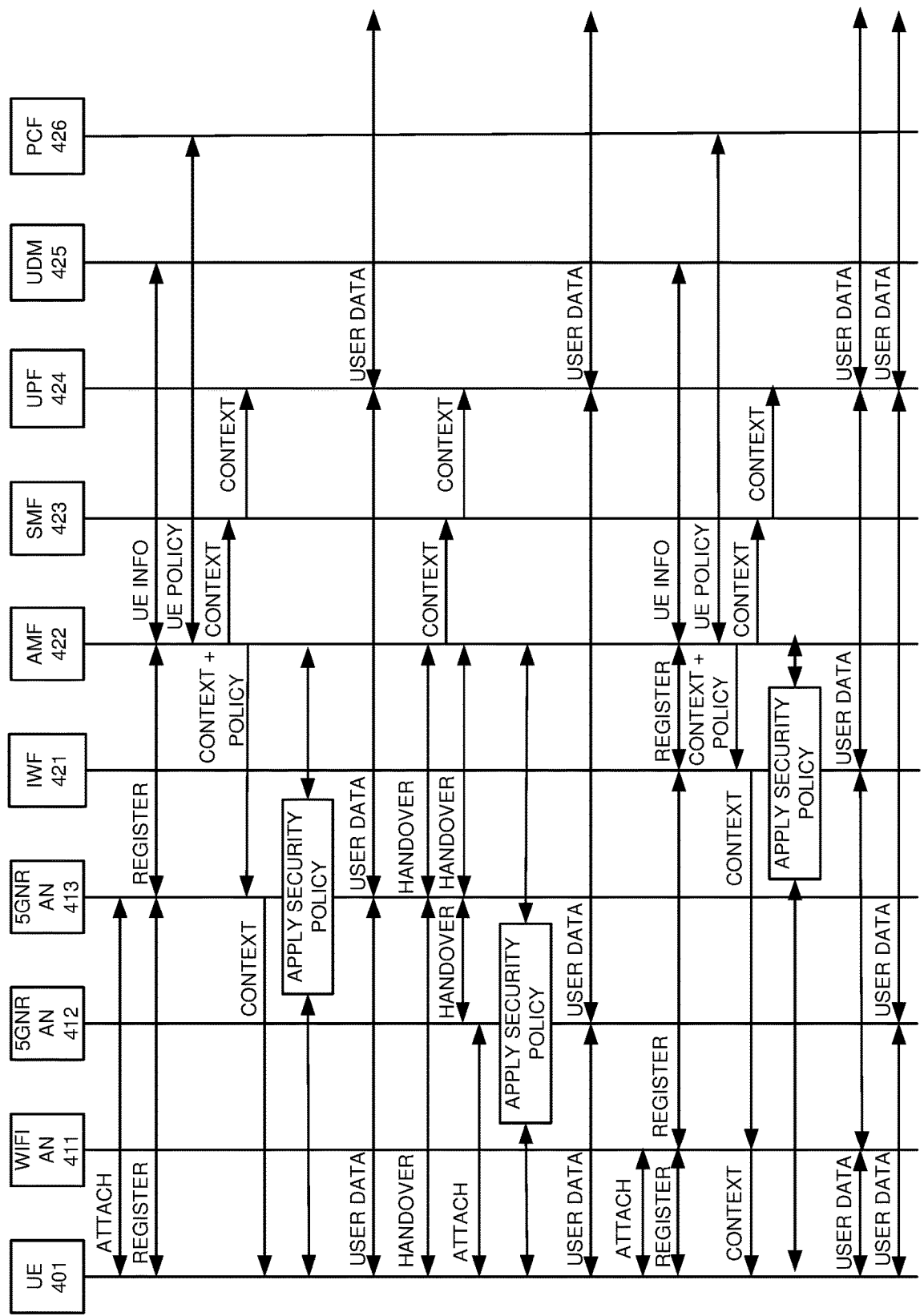
FIG. 9 illustrates an exemplary operation of the 5G communication network to serve the wireless data service to the wireless UE per the security policy.

FIG. 9 illustrates an exemplary operation of 5G communication network 400 to serve the wireless data service to wireless UE 401 per the security policy. The operation may vary in other examples. UE 401 wirelessly attaches to 5GNR AN 413 and registers with AMF 422 over 5GNR AN 413. AMF 422 authenticates UE 401 over 5GNR AN 413 and adds time-stamped authentication data to the security context for UE 401. AMF 422 authorizes UE 401 for a data service and adds time-stamped authorization data to the security context for UE 101. AMF 422 interacts with UDM 425 to get UE info for the above authentication and authorization. The UE info includes security context for UE 401. AMF 422 interacts with PCF 426 to obtain a policies that include a security policy for UE 401. AMF 422 transfers the security policy, some security context, and some other context for UE 401 to 5GNR AN 413. 5GNR AN 413 transfers some of the security context and the other context to UE 401. AMF 422 transfers some of the context to SMF 423 to serve UE 401. SMF 423 transfers some of the context to UPF 424 to serve UE 401. 5GNR AN 413 may interact with UE 401 and AMF 422 to implement the security policy. UE 401 exchanges user data with an external system (not shown) over 5GNR AN 413 and UPF 424.

UE 401 moves away from 5GNR AN 413 and toward 5GNR AN 412. UE 401 receives signals from 5GNR 412 and transfers handover signaling for 5GNR AN 412 to 5GNR AN 413. 5GNR AN 413 initiates a handover based on a signal strength comparison and transfers handover signaling to UE 401, 5GNR AN 412, and AMF 422. 5GNR AN 413 transfers the security policy, some security context, and some other context for UE 401 to 5GNR AN 412. AMF 422 indicates new context (AN 412) for UE 401 to SMF 423 which indicates the context for UE 401 to UPF 424. UE 401 now exchanges user data with an external system (not shown) over 5GNR AN 412 and UPF 424.

Contemporaneously and responsive to the handover, 5GNR AN 412 processes the security policy for UE 401. In this example, the security policy for UE 401 requires new UE authentication when UE 401 enters geographic area 430 which includes 5GNR AN 412. UE 401 enters geographic area 430. In response to the handover and the security policy, 5GNR AN 412 signals AMF 422 that new UE authentication for UE 401 is required. AMF 422 interacts with UE 401 perform another UE authentication and AMF 422 updates the security context for UE 401 with the fresh authentication status.

UE 401 moves away from 5GNR AN 412 and toward WIFI AN 411. UE 401 wirelessly attaches to WIFI AN 411, and in this example, UE 401 remains attaches to 5GNR AN 412. UE 401 interacts with IWF 421 to establish a secure link and then registers with AMF 422. AMF 422 authenticates UE 401 over WIFI AN 411 and IWF 421 and adds time-stamped authentication data to security context for UE 401. AMF 422 authorizes UE 401 for a data service and adds time-stamped authorization data to the security context for UE 101. AMF 422 interacts with UDM 425 to get UE information for the authentication and authorization. AMF 422 interacts with PCF 426 to obtain a security policy for UE 401. AMF 422 transfers the security policy and some of the security context and other context for UE 401 to IWF 422. IWF 422 transfers some of the security context and the other context to UE 401 over WIFI AN 411. AMF 422 transfers some of the context to SMF 423 to serve UE 401. SMF 423 transfers some of the context to UPF 424 to serve UE 401. UE 401 exchanges user data with an external system (not shown) over WIFI AN 411, IWF 421, and UPF 424. Contemporaneously and responsive to the registration, IWF 421 processes the security policy for UE 401. In this example, the security policy for UE 401 requires a new public key for network 400 when UE 401 uses WIFI AN 411. In response to the handover and the security policy, IWF 422 signals AMF 422 that another public key for UE 401 is required. AMF 422 interacts UDM 425 and UE 401 to transfer the new public key for network 400 to UE 401.

The security policy for UE 401 may require specific portions of the security context to be reestablished after UE 401 performs handovers to or form specific access nodes, networks, and/or geographic locations. The security policy for UE 401 may require specific portions of the security context to be reestablished after a time period that causes the UE authentication or service authorization to lapse.

The wireless data network circuitry described above comprises computer hardware and software that form special-purpose network circuitry to serve to wireless UEs per security policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve to wireless UEs per security policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to serve a wireless data service to wireless User Equipment (UE) per a security policy, the method comprising:
   a source access node receiving the security policy for the wireless UE from a wireless network core wherein the wireless network core and the wireless UE establish security context over the source access node;
   the source access node exchanging user data with the wireless network core and wirelessly exchanging the user data with the wireless UE, wherein the wireless network core and the UE exchange the user data over the source access node based on the security context;
   the source access node handing the wireless UE over to a target access node and responsively transferring the security policy for the wireless UE to the target access node;
   the target access node receiving the security policy from the source access node, and in response, signaling the wireless network core to establish new security context for the wireless UE, wherein the wireless network core and the wireless UE establish the new security context over the target access node; and
   the target access node exchanging additional user data with the wireless network core and wirelessly exchanging the additional user data with the wireless UE, wherein the wireless network core and the wireless UE exchange the additional user data over the target access node based on the new security context.

2. The method of claim 1 wherein:
   the security policy requires a portion of the security context to be reestablished after the handover from the source access node to the target access node; and
   the target access node signaling the wireless network core to establish the new security context for the wireless UE comprises signaling the wireless network core to reestablish the portion of the security context, wherein the wireless network core and the wireless UE reestablish the portion of the security context over the target access node.

3. The method of claim 1 wherein:
   the security policy requires a portion of the security context to be reestablished when the wireless UE enters a geographic area; and the target access node signaling the wireless network core to establish the new security context for the wireless UE comprises signaling the wireless network core to reestablish the portion of the security context in response to the wireless UE entering the geographic area, wherein the wireless network core and the wireless UE reestablish the portion of the security context over the target access node.

4. The method of claim 1 wherein:
the security policy requires a portion of the security context to be reestablished when the wireless UE leaves a geographic area; and
the target access node signaling the wireless network core to establish the new security context for the wireless UE comprises signaling the wireless network core to reestablish the portion of the security context in response to the wireless UE leaving the geographic area, wherein the wireless network core and the wireless UE reestablish the portion of the security context over the target access node.

5. The method of claim 1 wherein:
the security policy requires a portion of the security context to be reestablished when the wireless UE returns from idle mode in a geographic area; and
the target access node signaling the wireless network core to establish the new security context for the wireless UE comprises signaling the wireless network core to reestablish a portion of the security context in response to the wireless UE returning from the idle mode in the geographic area, wherein the wireless network core and the wireless UE reestablish the portion of the security context over the target access node.

6. The method of claim 1 wherein:
the security policy requires a portion of the security context to be reestablished when the wireless UE attaches to a particular wireless network; and
the target access node signaling the wireless network core to establish the new security context for the wireless UE comprises signaling the wireless network core to reestablish the portion of the security context in response to the wireless UE attaching to the particular wireless network, wherein the wireless network core and the wireless UE reestablish the portion of the security context over the target access node.

7. The method of claim 1 wherein:
the security context comprises a stale authentication for the wireless UE; and
the new security context comprises a fresh authentication for the wireless UE.

8. The method of claim 1 wherein:
the security context comprises a stale authorization for the wireless data service; and
the new security context comprises a fresh authorization for the wireless data service.

9. The method of claim 1 wherein:
the security context comprises cryptography key for the wireless UE; and
the new security context comprises a new cryptography key for the wireless UE.

10. The method of claim 1 wherein the source access node receiving the security policy for the wireless UE from the wireless network core comprises receiving the security policy for the wireless UE over an Access and Mobility Management Function (AMF) from at least one of a Unified Data Management (UDM), a Session Management Function (SMF), and a Policy Control Function (PCF).

11. A wireless communication system to serve a wireless data service to wireless User Equipment (UE) per a security policy, the wireless communication system comprising:
a source access node configured to receive the security policy for the wireless UE from a wireless network core wherein the wireless network core and the wireless UE are configured to establish security context over the source access node;
the source access node configured to exchange user data with the wireless network core and wirelessly exchange the user data with the wireless UE, wherein the wireless network core and the UE are configured to exchange the user data over the source access node based on the security context;
the source access node configured to hand the wireless UE over to a target access node and responsively transfer the security policy for the wireless UE to the target access node;
the target access node configured to receive the security policy from the source access node, and in response, signal the wireless network core to establish new security context for the wireless UE, wherein the wireless network core and the wireless UE are configured to establish the new security context over the target access node; and
the target access node configured to exchange additional user data with the wireless network core and wirelessly exchange the additional user data with the wireless UE, wherein the wireless network core and the wireless UE are configured to exchange the additional user data over the target access node based on the new security context.

12. The wireless communication system of claim 11 wherein:
the security policy requires a portion of the security context to be reestablished after the handover from the source access node to the target access node; and
the target access node is configured to signal the wireless network core to reestablish the portion of the security context to signal the wireless network core to establish the new security context for the wireless UE, wherein the wireless network core and the wireless UE are configured to reestablish the portion of the security context over the target access node.

13. The wireless communication system of claim 11 wherein:
the security policy requires a portion of the security context to be reestablished when the wireless UE enters a geographic area; and
the target access node is configured to signal the wireless network core to reestablish the portion of the security context in response to the wireless UE entering the geographic area to signal the wireless network core to establish the new security context for the wireless UE, wherein the wireless network core and the wireless UE are configured to reestablish the portion of the security context over the target access node.

14. The wireless communication system of claim 11 wherein:
the security policy requires a portion of the security context to be reestablished when the wireless UE leaves a geographic area; and
the target access node is configured to signal the wireless network core to reestablish the portion of the security context in response to the wireless UE leaving the geographic area to signal the wireless network core to establish the new security context for the wireless UE, wherein the wireless network core and the wireless UE are configured to reestablish the portion of the security context over the target access node.

15. The wireless communication system of claim 11 wherein:
the security policy requires a portion of the security context to be reestablished when the wireless UE returns from idle mode in a geographic area; and
the target access node is configured to signal the wireless network core to reestablish a portion of the security context in response to the wireless UE returning from the idle mode in the geographic area to signal the wireless network core to establish the new security context for the wireless UE, wherein the wireless network core and the wireless UE are configured to reestablish the portion of the security context over the target access node.

16. The wireless communication system of claim 11 wherein:
the security policy requires a portion of the security context to be reestablished when the wireless UE attaches to a particular wireless network; and
the target access node is configured to signal the wireless network core to reestablish the portion of the security context in response to the wireless UE attaching to the particular wireless network to signal the wireless network core to establish the new security context for the wireless UE, wherein the wireless network core and the wireless UE are configured to reestablish the portion of the security context over the target access node.

17. The wireless communication system of claim 11 wherein:
the security context comprises a stale authentication for the wireless UE; and
the new security context comprises a fresh authentication for the wireless UE.

18. The wireless communication system of claim 11 wherein:
the security context comprises a stale authorization for the wireless data service; and
the new security context comprises a fresh authorization for the wireless data service.

19. The wireless communication system of claim 11 wherein:
the security context comprises cryptography key for the wireless UE; and
the new security context comprises a new cryptography key for the wireless UE.

20. The wireless communication system of claim 11 wherein the source access node is configured to receive the security policy for the wireless UE over an Access and Mobility Management Function (AMF) from at least one of a Unified Data Management (UDM), a Session Management Function (SMF), and a Policy Control Function (PCF) to receive the security policy for the wireless UE from the wireless network core.

* * * * *